United States Patent [19]

Zeeh et al.

[11] 4,139,641
[45] Feb. 13, 1979

[54] FURAN AND THIOPHENE DERIVATIVES AS PRESERVATIVES AND SILAGE CONDITIONERS

[75] Inventors: Bernd Zeeh, Ludwigshafen; Johann Jung, Limburgerhof; Eberhard Ammermann, Ludwigshafen, all of Fed. Rep. of Germany

[73] Assignee: BASF Aktiengesellschaft, Ludwigshafen, Fed. Rep. of Germany

[21] Appl. No.: 834,419

[22] Filed: Sep. 19, 1977

[30] Foreign Application Priority Data

Oct. 9, 1976 [DE] Fed. Rep. of Germany ....... 2645715

[51] Int. Cl.² ................................................ A23K 1/22
[52] U.S. Cl. ........................................ 426/69; 426/72; 426/74; 426/630; 426/634; 426/636
[58] Field of Search ................... 426/53, 54, 623, 69, 426/630, 635, 636, 2, 807; 424/275, 285; 260/332.3 R, 329 R, 347.8, 332.3 C

[56] References Cited

U.S. PATENT DOCUMENTS

| | | | |
|---|---|---|---|
| 2,527,372 | 2/1948 | Moyle et al. | 426/532 X |
| 3,031,447 | 4/1962 | Saikachi et al. | 426/532 |
| 3,687,977 | 8/1972 | Rippel et al. | 424/275 |
| 4,010,165 | 3/1977 | Koenig et al. | 260/332.3 R |

OTHER PUBLICATIONS

Cagniant et al., "3 Substituted Thiophenes" Chemical Abstracts, vol. 66, 115522b, 1967.

*Primary Examiner*—R. B. Penland
*Attorney, Agent, or Firm*—Keil, Thompson & Shurtleff

[57] ABSTRACT

Agents for preserving and ensiling animal feedstuffs and which contain one or several furan or thiophene derivatives, and the use thereof. These furan or thiophene derivatives have the general formula

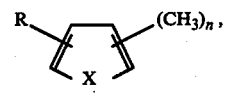

where X denotes oxygen or sulfur, R denotes the radicals —CHO, —CN or —COOR³, or the vinylogous radicals —CH═CH—CHO, —CH═CH—C≡N or —CH═CH—COOR³, R³ denoting hydrogen, a cation equivalent or alkyl of from 1 to 4 carbon atoms, and n denotes one of the integers 0, 1, 2 and 3.

7 Claims, No Drawings

FURAN AND THIOPHENE DERIVATIVES AS PRESERVATIVES AND SILAGE CONDITIONERS

BACKGROUND OF THE INVENTION

The present invention relates to agents for preserving and ensiling animal feedstuffs and which contain furan or thiophene derivatives, and the use of these agents.

Numerous bacteriostatic and fungistatic compounds are known which, when added to feedstuffs, protect them against microbial decay. Thus, for instance, inorganic acids such as phosphoric acid, sulfuric acid and hydrochloric acid, or organic acids such as formic acid, acetic acid, propionic acid, lactic acid, sorbic acid, benzoic acid, salicylic acid and citric acid, optionally in the form of their salts or esters, and formaldehyde or hexamethylenetetramine are used as preservatives (Handbuch der Futtermittel, 1, 263 et seq., Verlag P. Parey, Hamburg, 1969).

Because of complicated application techniques, the use of liquid acids in agriculture is often problematic, and, due to the irritant effect on the mucous membrane and the caustic action of the acids, not without danger. Furthermore, the storage and use of these preservatives is made more difficult by their corrosive action on metals. Because of these drawbacks, the pure acids are often replaced by their salts, especially the sodium, calcium, aluminum, and ammonium salts. However, the difficulties occurring in the metering of these particulate salts, especially in granular form, are again disadvantageous. When acids are used in solid form, the same metering problems occur. The action of the prior art agents is not always satisfactory either.

SUMMARY OF THE INVENTION

We have now found that preservatives containing at least one furan or thiophene derivative of the formula

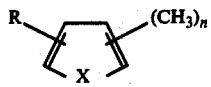

I, where X denotes oxygen or sulfur, R denotes the radicals —CHO, —CH or COOR³ or the vinylogous radicals —CH=CH—CHO, —CH=CH—CH≡N or —CH=CH—COOR³, R³ denoting hydrogen, a cation equivalent or alkyl of 1 to 4 carbon atoms, and n denotes one of the integers 0, 1, 2 and 3, have an excellent preservative action on feedstuffs and may be used as silage conditioners.

The following compounds, for instance, have a very good preservative action: furan aldehydes and thiophene aldehydes such as furan-2-aldehyde, thiophene-2-aldehyde, thiophene-3-aldehyde, their vinylogs such as β-(2-furyl)-acrolein, β-(2-thienyl)-acrolein, β-(3-thienyl)-acrolein, and their mono-, di- and trimethyl-substituted derivatives such as 5-methylthiophene-2-aldehyde, 3-methylthiophene-2-aldehyde, 5-methylfuran-2-aldehyde; furan and thiophene carbonitriles such as furan-2-carbonitrile, furan-3-carbonitrile, thiophene-2-carbonitrile, thiophene-3-carbonitrile, their vinylogs such as β-2-furyl acrylonitrile, β-3-furyl acrylonitrile, β-2-thienyl acrylonitrile, β-3-thienyl acrylonitrile, and their mono- di- and trimethyl-substituted derivatives; furan and thiophene carboxylic acids such as furan-2-carboxylic acid, duran-3-carboxylic acid, furan-3,4-dicarboxylic acid, thiophene-2-carboxylic acid, thiophene-3-carboxylic acid, their vinylogs such as β-2-furyl acrylic acid, β-2-thienyl acrylic acid, β-3-thienyl acrylic acid, and the mono-, di- and trimethyl-substituted derivatives of these acids such as 3,4,5-trimethylfuran-3-carboxylic acid, further, esters of these acids, e.g., the methyl, ethyl, propyl or butyl esters, or salts of these acids, e.g., the ammonium, alkali metal, alkaline earth metal, manganese(II), copper(II), cobalt-(II) and zinc salts.

Particularly effective are compounds of the formula I in which R denotes the radical —CHO, e.g., furan-2-aldehyde, thiophene-2-aldehyde, thiophene-3-aldehyde and their monomethyl-substituted derivatives.

The preservative compounds according to the invention have the special advantage that they are odorless or, particularly in the case of the aldehydes, have a pleasant aromatic odor. With the exception of the carboxylic acids and their salts, they are liquid under normal conditions and can thus be metered very easily. Particularly feedstuffs treated with furan or thiophene aldehyde derivatives may be stored and transported in unprotected vessels, e.g., unalloyed steel vessels.

The agents according to the invention are suitable for preserving feedstuffs in amounts as small as approx. 0.1 wt%, based on the feedstuff; generally, an addition of up to 20 wt% suffices. Expediently, 0.2 to 0.8 wt% (in each case, with reference to the feed) is added to green forage of all kinds (e.g., grass, alfalfa, clover and corn), 0.2 to 0.6 wt% to freshly harvested cereal feeds of all kinds (barley, oats, rye, wheat) and Indian corn and legumes for feed purposes, and 0.2 to 2.0 wt% to mixed feeds and their components (e.g., tapioca, cereal-based products, products of the starch, sugar and oil industries, animal and vegetable protein products). The requisite application rate increases as the moisture content of the feeds rises.

The agents according to the invention may also contain mixtures of compounds coming under the formula I or, for a still better action, mixtures with other, prior art, preservatives. It is also possible to employ mixtures containing substances beneficial to animals, e.g., vitamins, minerals, urea and trace elements. The trace elements may also be added together with the preservatives in the form of their furan or thiophene carboxylic acid salts, e.g., the manganese(II), copper(II) or cobalt-(II) salts.

The compounds of the formula I are known; the preparation thereof is disclosed in the literature.

DESCRIPTION OF THE PREFERRED EMBODIMENTS

To prove the good preservative action of the compounds according to the invention, experiments were carried out with wheat ("Kolibri" variety) and a commercial mixed feed (concentrated pigfeed - single formulation, type "Alleinfutter 1").

1. The preservatives listed in the table are added to 100 g of wheat containing 25% moisture and to 100 g of the mixed feed containing 30% moisture. The samples are placed in one-trip Petri dishes and inoculated with microorganisms specific to wheat and mixed feeds. The Petri dishes are incubated for 10 days in an incubator kept at 30° C. The samples are then assessed in accordance with a fixed scheme for smell, degree of fungus attack, and consistency.

The results contained in the following table may be summarized as follows:

Whereas under the abovementioned conditions the untreated controls are completely spoilt, the samples can be kept in faultless conditions even under these extreme storage conditions by the addition of 0.4 wt% of the compounds of the invention. The excellent preservative effect prevents putrefaction and mold formation, and inhibits agglomeration of the feeds.

The action of the prior art preservatives benzoic acid and hexamethylenetetramine is considerably inferior by comparison.

| | | | Preservative action in mixed feed and wheat | | | | | | |
|---|---|---|---|---|---|---|---|---|---|
| | Application | | Smell | | Degree of attack | | Consistency | | Overall |
| Compound | rate | Days' storage | mixed feed | wheat | mixed feed | wheat | mixed feed | wheat | assessment |
| untreated | — | 10 | h | d | 10 | 10 | 10 | 8 | 8 |
| Benzoic acid | 0.1% | 10 | h | e | 10 | 10 | 8 | 8 | 8 |
| " | 0.2% | 10 | h | e | 10 | 10 | 8 | 6 | 8 |
| " | 0.4% | 10 | h | e | 10 | 10 | 8 | 6 | 8 |
| Hexamethylene-tetramine | 0.1% | 10 | h | e | 10 | 8 | 8 | 6 | 8 |
| " | 0.2% | 10 | g | d | 10 | 8 | 8 | 6 | 8 |
| " | 0.4% | 10 | g | d | 10 | 8 | 8 | 6 | 8 |
| Furan-2-aldehyde | 0.1% | 10 | c | d | 0 | 10 | 0 | 6 | 6 |
| " | 0.2% | 10 | c | d | 0 | 8 | 0 | 4 | 4 |
| " | 0.4% | 10 | c | d | 0 | 4 | 0 | 4 | 2 |
| 5-Methylfuran-2-aldehyde | 0.1% | 10 | c | d | 0 | 6 | 0 | 6 | 4 |
| | 0.2% | 10 | c | d | 0 | 6 | 0 | 4 | 4 |
| | 0.4% | 10 | c | c | 0 | 0 | 0 | 0 | 0 |
| Thiophene-2-aldehyde | 0.1% | 10 | c | d | 2 | 6 | 2 | 6 | 4 |
| | 0.2% | 10 | c | d | 0 | 6 | 0 | 6 | 4 |
| | 0.4% | 10 | c | c | 0 | 0 | 0 | 0 | 0 |
| Thiophene-3-aldehyde | 0.1% | 10 | a | b | 0 | 2 | 0 | 4 | 2 |
| | 0.2% | 10 | a | b | 0 | 2 | 0 | 4 | 2 |
| | 0.4% | 10 | a | b | 0 | 0 | 0 | 0 | 0 |
| 3-Methylthiophene-2-aldehyde | 0.1% | 10 | c | d | 0 | 6 | 0 | 6 | 4 |
| | 0.2% | 10 | c | c | 0 | 0 | 0 | 0 | 0 |
| | 0.4% | 10 | c | c | 0 | 0 | 0 | 0 | 0 |
| β-(2-Furyl)-acrolein | 0.1% | 10 | d | e | 6 | 8 | 4 | 6 | 6 |
| | 0.2% | 10 | a | e | 0 | 8 | 0 | 6 | 4 |
| | 0.4% | 10 | a | b | 0 | 0 | 0 | 0 | 0 |
| Thiophene-3-nitrile | 0.1% | 10 | h | d | 10 | 8 | 8 | 6 | 8 |
| | 0.2% | 10 | c | c | 4 | 6 | 2 | 4 | 4 |
| | 0.4% | 10 | c | c | 0 | 0 | 0 | 0 | 0 |
| β-(2-Furyl)-acrylonitrile | 0.1 | 10 | c | c | 0 | 2 | 0 | 2 | 2 |
| | 0.2 | 10 | c | c | 0 | 0 | 0 | 0 | 0 |
| | 0.4 | 10 | c | c | 0 | 0 | 0 | 0 | 0 |
| 2,4,5-Trimethylfuran-3-carboxylic acid | 0.1% | 10 | d | d | 4 | 4 | 2 | 2 | 4 |
| | 0.2% | 10 | c | c | 2 | 2 | 2 | 2 | 2 |
| | 0.4% | 10 | a | b | 0 | 2 | 0 | 2 | 2 |
| diethyl furan-3,4-dicarboxylate | 0.1% | 10 | h | e | 10 | 6 | 8 | 4 | 8 |
| | 0.2% | 10 | h | e | 10 | 6 | 8 | 4 | 8 |
| | 0.4% | 10 | e | b | 2 | 0 | 4 | 0 | 2 |
| ethyl thiophene-2-carboxylate | 0.1% | 10 | g | e | 10 | 8 | 8 | 6 | 8 |
| | 0.2% | 10 | g | e | 10 | 8 | 8 | 6 | 8 |

| Compound | Application rate | Days' storage | Preservative action in mixed feed and wheat | | | | | | Overall assessment |
|---|---|---|---|---|---|---|---|---|---|
| | | | Smell | | Degree of attack | | Consistency | | |
| | | | mixed feed | wheat | mixed feed | wheat | mixed feed | wheat | |
| | 0.4% | 10 | d | a | 6 | 0 | 6 | 0 | 4 |

Smell
a = faultless
b = aromatic
c = smell of additive
d = slightly musty
e = musty
f = extremely musty
g = slightly putrescent
h = putrescent
i = extremely putrescent
Degree of attack
0 = no attack
2 = slight attack
4 = isolated fungus islets
6 = heavy attack
8 = fungus almost completely covers surface
10 = closed fungus surface
Consistency
0 = free-flowing
2 = restricted flowability
4 = slight agglomeration
6 = agglomeration
8 = considerable agglomeration
10 = solid cake
Overal assessment
0 = excellent action
2 = good action
4 = moderate action
6 = poor action
8 = no action 2. The preservatives listed in the following table are added in amounts of 0.1, 0.3 and 0.5 wt% to 30 kg of a mixed feed having a moisture content of about 18 wt%. Over a 90 day period, the samples are assessed for rise in temperature, consistency (agglomeration) and fungus attack.

The results contained in the following table show that the untreated controls have putrefied after as little as 11 days, whereas the samples to which 0.3 wt% of furan-2-aldehyde, thiophene-2-aldehyde or thiophene-3-aldehyde has been added are still in perfect condition after 90 days.

| Compound | Application rate | Change in feed after days | | | |
|---|---|---|---|---|---|
| | | Heating | Agglomeration | First attack of mold | Closed fungus surface |
| Untreated | — | 3 | 5 | 5 | 11 |
| Propionic acid | 0.1% | 5 | 6 | 8 | 11 |
| | 0.3% | 63 | 64 | 65 | 70 |
| | 0.5% | at end of experiment caking observed | | | |
| Furan-2-aldehyde | 0.1% | 49 | 48 | 52 | 68 |
| | 0.3% | } No changes during experimental period | | | |
| | 0.5% | | | | |
| Thiophene-2-aldehyde | 0.1% | 7 | 10 | 13 | 20 |
| | 0.3% | } No changes during experimental period | | | |
| | 0.5% | | | | |
| Thiophene-3-aldehyde | 0.1% | 10 | 13 | 15 | 20 |
| | 0.3% | } No changes during experimental period | | | |
| | 0.5% | | | | |

We claim:

1. A preserved and ensilaged animal feedstuff which comprises: an animal feedstuff and, incorporated therein as a preservative an effective amount of at least one furan or thiophene derivative of the formula

I, where X denotes oxygen or sulfur, R denotes the radicals —CHO, —CN or COOR$^3$, or the vinylogous radicals —CH=CH—CHO, —CH=CH—C≡N or —CH=CH—COOR$^3$, R$^3$ denoting hydrogen, a cation equivalent or alkyl of 1 to 4 carbon atoms, and n denotes one of the integers 0, 1, 2 and 3.

2. A feedstuff as set forth in claim 1, wherein R denotes the radical —CHO.

3. A feedstuff as set forth in claim 1, which additionally contains at least one feed supplement selected from vitamins, minerals, urea and trace elements.

4. A feedstuff as set forth in claim 1 wherein the amount of compound I is from about 0.1 to 20% by weight based on the weight of the feedstuff.

5. A feedstuff as set forth in claim 1 wherein said feedstuff contains a green forage and from about 0.2 to 0.8% by weight of compound I.

6. A feedstuff as set forth in claim 1 wherein the feedstuff contains at least one selected from the group consisting of barley, oats, rye, wheat, corn and legumes and from about 0.2 to 0.6% by weight of compound I.

7. A process for preserving and ensiling feedstuffs which comprises: adding to the feedstuffs from about 0.1 to 20% by weight, based on the feedstuffs, of at least one furan or thiophene derivative of the formula

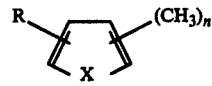

I, where X denotes oxygen or sulfur, R denotes the radicals —CHO, —CN or COOR$^3$, or the vinylogous radicals —CH=CH—CHO, =CH=CH—C≡N or —CH=CH—COOR$^3$, R$^3$ denoting hydrogen, a cation equivalent or alkyl of 1 to 4 carbon atoms, and n denotes one of the integers 0, 1, 2 and 3.

* * * * *